O. Reeves,
Washing Machine,
Nº 48,837.        Patented July 18, 1865.
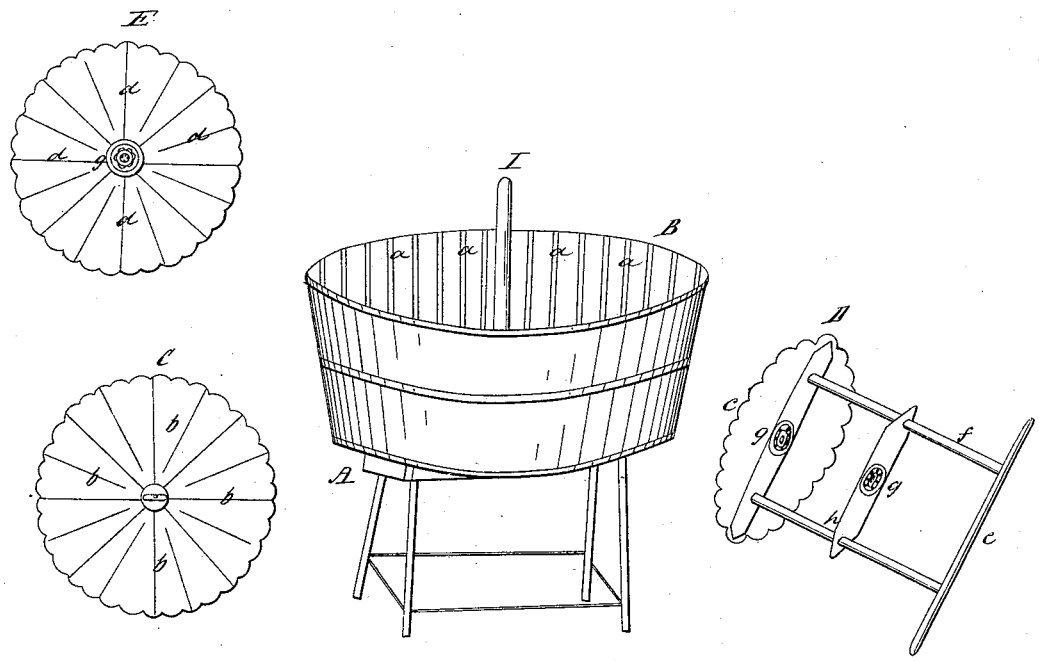
Witnesses
B. R. Skinner
E. P. Skinner
Inventor
Orrin Reeves

UNITED STATES PATENT OFFICE.

ORRIN REEVES, OF GREENPORT, NEW YORK.

WASHING-MACHINE.

Specification forming part of Letters Patent No. 48,837, dated July 18, 1865.

*To all whom it may concern:*

Be it known that I, ORRIN REEVES, of Greenport, in the county of Suffolk and State of New York, have invented an improvement upon my washing-machine patented February 7, 1865; and I do hereby declare that the following is a full, clear, and exact description thereof, reference being had to the accompanying drawings, making a part of this specification, and to the letters of reference marked thereon.

My invention consists in an improvement upon the before-mentioned patent by which the rubber therein mentioned is made to act upon friction-rollers and a metal standard.

To enable others skilled in the art to make and use my invention, I will proceed to describe the same with reference to the drawings.

A represents a bench or stand upon which the tub B may stand. The tub may be of the ordinary form, and has upon its inside a series of vertical, or nearly vertical, ribs, $a$ $a$, extending from its bottom to the top thereof.

The bottom C of the tub, on the inside, is furnished with radial flutings or ribs $b$ $b$, forming a good rubbing-surface.

The rubber D is scalloped at its perimeter, as shown at $c$, and has upon its under side, as exhibited in E, radial flutings or ribs $d$ to act in conjunction with ribs $b$ on the bottom of the tub.

The rubber D is of such diameter as to freely turn within the tub, and may be turned by means of the lever $e$, united to the standards $f$ $f$, which are let in or otherwise secured to the rubber for that purpose, and which standards are further united by a cross-piece, $h$, in which, as well as in the rubber at $g$ and $g$, friction-rollers, six on the middle cross-piece and six on the bottom, made of brass and banded together with the same metal, are inserted, which, playing upon the standards I, made of brass, to prevent rust, cause the rubber to move easily, swiftly, and smoothly.

Having thus fully described my invention, what I claim is—

The standard and friction-rollers $g$ $g$ in the rubbing-board D, in combination with a tub having ribs on its inner perimeter and radial flutes or ribs on its bottom, the rubbing-board having a scalloped perimeter and radial ribs on its under side, as and for the purposes herein described and represented.

Dated at Greenport, New York, May 29, 1865.

ORRIN REEVES.

Witnesses:
 B. R. SKINNER,
 E. E. D. SKINNER.